United States Patent [19]

Punsmann et al.

[11] 4,044,872
[45] Aug. 30, 1977

[54] COUPLING THE SWITCHING OF WHICH IS DEPENDENT ON THE ROTATIONAL SPEED

[75] Inventors: Josef Punsmann, Bocholt; Ludger Hecking, Holtwick, both of Germany

[73] Assignee: A. Friedr. Flender & Co., Bocholt, Germany

[21] Appl. No.: 673,894

[22] Filed: Apr. 5, 1976

[30] Foreign Application Priority Data
Apr. 9, 1975 Germany .............................. 2515351

[51] Int. Cl.² ............................................. F16D 23/10
[52] U.S. Cl. .................................. 192/103 A; 64/29; 192/56 R
[58] Field of Search ................. 192/104 R, 103 A, 56; 64/9, 29

[56] References Cited

U.S. PATENT DOCUMENTS

| | | | |
|---|---|---|---|
| 1,585,567 | 5/1926 | Sommer | 192/104 R |
| 3,779,354 | 12/1973 | Ball | 192/104 R |
| 3,787,136 | 1/1974 | Steiner | 192/56 R |
| 3,977,213 | 8/1976 | Spencer | 64/28 |

*Primary Examiner*—Samuel Scott
*Assistant Examiner*—Randall Heald

[57] ABSTRACT

A coupling which is switched dependent on the rotational speed. One coupling half is held in fixed relationship with another coupling half up to a switching speed while being supported on switching elements. These elements are centrifugally controlled and spring loaded, and they are pivoted and coupled to one another by a switching ring for joint tilting. One coupling half is supported, furthermore, on the switching element by a ring which is elastic in axial direction.

11 Claims, 3 Drawing Figures

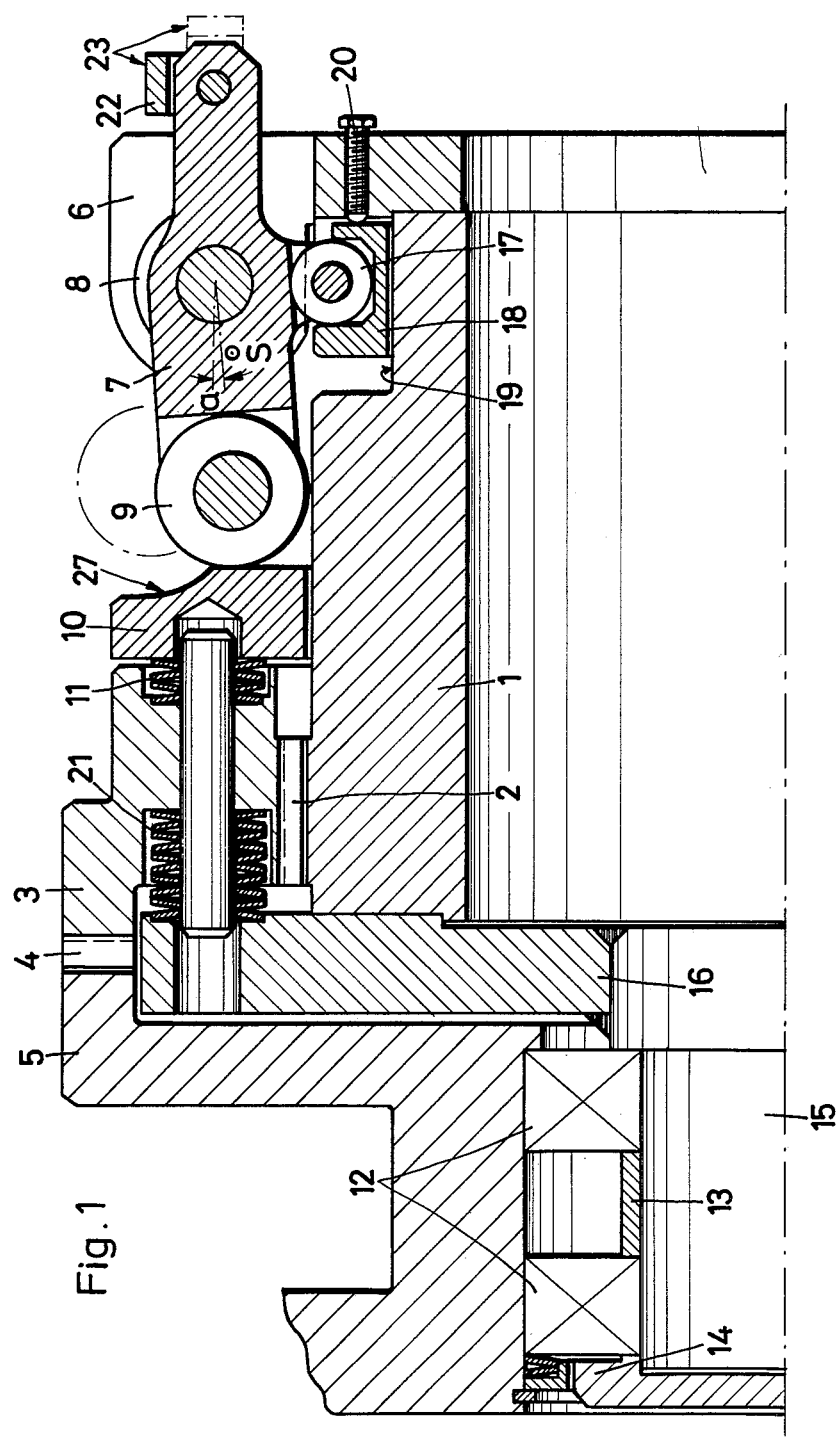

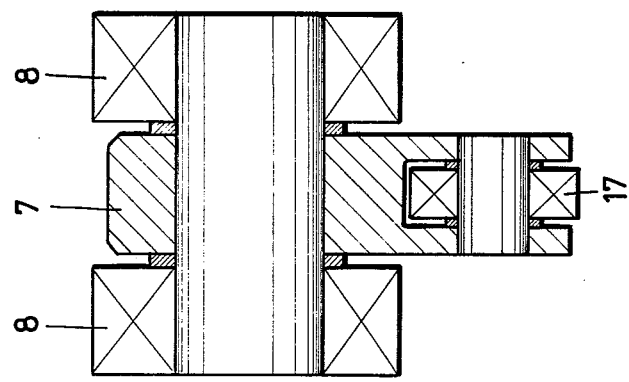
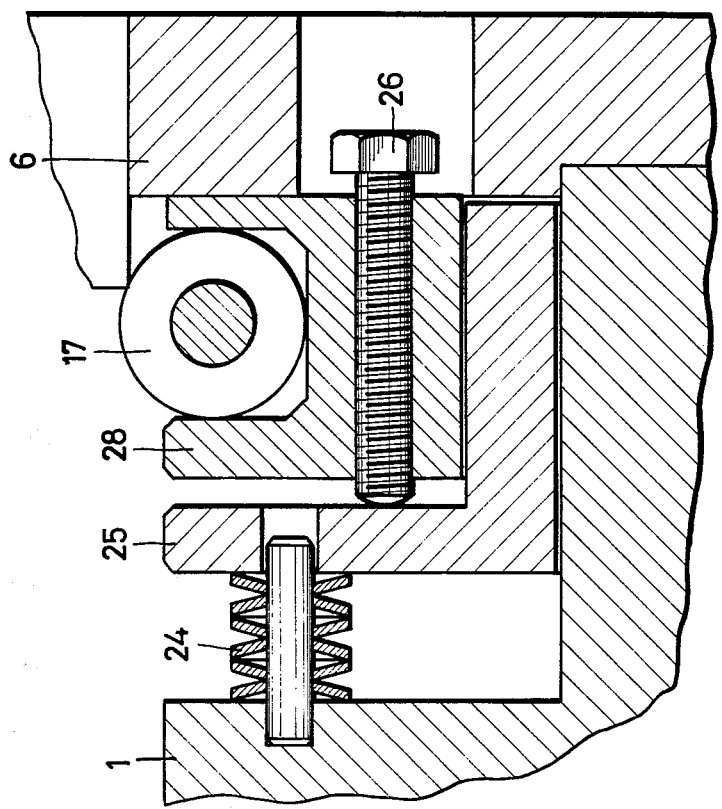

COUPLING THE SWITCHING OF WHICH IS DEPENDENT ON THE ROTATIONAL SPEED

BACKGROUND OF THE INVENTION

The invention relates to a coupling whose switching is dependent on the rotational speed, one coupling half thereof being held in fixed connection with the other coupling, half up to the switching speed, by being supported on several switching elements which are centrifugally controlled and spring loaded.

In a known coupling of this type the switching elements are distributed around the coupling axis and shiftably positioned on radially arranged bolts against the force of a spring which is associated with each individual switching element. The separation of the fixed connection of both coupling halves is only achieved when all switching elements have moved radially outwards as a result of the centrifugal force acting on them. As the moving of each individual switching elements is independent, of the others, the danger of the radial movement of the switching elements not being achieved simultaneously exists because of different adjustment to springs and different load of the switching elements supporting one coupling half. An exact adjustment to the switching speed is therefore difficult. The unguaranteed synchronous radial movement of the switching elements presents the further disadvantage that one coupling half can be swung, after removing the support on one part of the one coupling half, with the effect that jamming occurs. This also renders the adjustment of an exact switching speed difficult.

The direct support of the switching elements on the one coupling half presents the disadvantage that the pressure between the switching elements and the one coupling half, and with that the resistance of the switching elements against being moved by centrifugal force, is influenced by the axial component of the circumferential force of the torque. This coupling is therefore not independent of the torque (German Auslegeschrift 2 300 216).

The object of the invention consists in making a coupling whose switching is dependent on the rotational speed of the above named type in which the switching speed can be easily adjusted.

SUMMARY OF THE INVENTION

This object is solved according to the invention in that the switching elements are pivoted and are coupled to one another by a switching ring for joint tilting.

It is guaranteed that all switching elements can only be tilted jointly with the coupling according to the invention. The support of the one coupling half on its complete circumference is removed at the same time by this. It is not possible to swing the one coupling half with the effect of jamming. Adjustment of the switching speed is also easy, as different points of response of the switching elements formed as centrifugal weights balance out over the switching ring.

According to one development of the invention the one coupling half is supported on the switching elements by a ring which is elastic in axial direction. The elastic ring operates as an equalizing element for axial tolerances in manufacturing.

A switching speed which is completely independent of the torque to be transmitted, is achieved according to the invention in that pressure springs are provided between the ring and the one coupling half, the prestressing of said springs being greater in a coupling which is switched on, than the axial component of the circumferential force of the torque to be transmitted. In this development the pressure between the switching elements and the ring is only determined by the constant prestressing so that the resistance of the switching elements against being moved by the centrifugal forces acting on them is constant and therefore independent of the torque.

The switching elements can be supported on the one coupling half or the ring with rollers in order to keep the friction between the points of support on the switching elements and the one coupling half or the ring as low as possible with the tilting movement of the switching elements.

The switching elements can be easily held up to switching speed in their original position, in which they keep both coupling halves switched on, by the points of support on the tiltable switching elements having a smaller space from the coupling axis than from their tilting axes. A spring arrangement could also be provided for this, as an alternative.

Springs acting on the one coupling half can be provided which effect or support the separation of both coupling halves, so that both coupling halves are separated after removing the support of the one coupling half or ring on the switching elements. It is necessary, with this additional feature of the invention, for achieving a switching speed which is independent of the torque, that the springs supporting the ring have a prestressing force which is greater than the sum of the forces of the axial component of the circumferential force of the torque to be transmitted, and of the springs which effect or support the separation.

According to a constructively expedient arrangement the switching elements are coupled to the axially shiftable switching ring with noses. The switching ring can be adjustable in its relative axial position to the tilting axes of the switching elements. A further possibility of adjustment can be achieved by the switching ring, which is prestressed by springs working axially. A step or inclination can be provided on the support surface of the one coupling half or the ring, in order to prevent the switching elements from automatically tilting back. Moreover, the switching speed can be made adjustable by balance weights, adjustably secured on the switching elements.

A further development of the invention consists in the one coupling half or its ring having a step or inclination on the support surface, this step or inclination preventing the switching elements from automatically tilting back by the prestressed springs of the switching ring.

BRIEF DESCRIPTION OF THE DRAWINGS

The invention is explained in further detail as follows by means of a drawing illustrating an example of operation. Individually, FIG. 1 shows a safety coupling switch dependent on the rotational speed in half axial cross-section;

FIG. 2 shows a cross-section according to line I-I of FIG. 1 and

FIG. 3 shows an alternative arrangement of a switching ring for a switching coupling according to FIG. 1.

DESCRIPTION OF THE PREFERRED EMBODIMENTS

A coupling half 3 is positioned on a hub part 1 by means of axial tooth connection 2 so that said coupling half 3 is both axially displaceable and fixed against rotation on the hub part 1. The coupling half 3 is connected to another coupling half 5 in fixed position by radial tooth connection, the teeth of which, have inclined flanks. A pressure plate 6 is bolted onto the end of the hub part 1, opposed to the coupling half 5. In said pressure plate 6 several switching elements 7 are pivoted by means of pivots 8. Each switching element 7 bears a pressure roller 9 on the end facing the coupling half 3, said pressure roller 9 being supported in the shown switched-on-position of both coupling halves 3, 5 on a ring 10, which can, for example, be composed of spring steel and can be flexible in an axial direction by correspondingly thin dimensioning. The ring 10 is supported on the coupling half 3 by springs 11. The coupling half 5 is arranged on a plug 15 by bearings 12. The bearings 12 are axially secured on the plug 15 by a step, a plate 14, which is frontally secured to the plug 15, and a distance sleeve 13. The plug 15 has a flange 15 arranged in fixed position thereon, said flange 16 being bolted on to the hub part 1 in fixed axial position and on which springs 21 are supported which act on the one coupling half 3 in switch-off direction.

The axial contact pressure applies to the radial tooth connection 4 of both coupling halves 3, 5 by the springs 11 is transferred onto the ring 10 by the bearings 12, the plug 15, the flange 16, the hub part 1, the pressure plate 6, the pivots 8, the switching elements 7, the pressure roller 9, on said ring 10 springs 11 are supported. The force of the springs 11 must be greater than the sum of the forces of springs 21 and of the axial component of the torque to be transmitted, said axial component arising at the inclining flanks of the radial tooth connection, so that the radial tooth connection 4 remains in gear and springs 11 is not more strongly compressed. The coupling is under this stipulation completely independent of the torque.

The switching elements 7 are formed as double-armed levers which have balance weights 22 on the lever arm opposed to the pressure roller 9, said weights 22 being securable in various positions 23 to adjust the switching speed. Noses bearing rollers 17 are secured to the switching elements 7, said noses all intermeshing in a switching ring 18 which is U-formed in cross-section and is axially displaceable in an annular groove 19 of the hub part 1. In this way, there is achieved the tilting of all switching elements 7 dependently on, and synchronously to, one another.

The point of support of a switching element 7 on the ring 10 is nearer to the coupling axis than the tilting axis in order to provide the switching elements 7 with a stable position with a switched on coupling. This is indicated in the drawing by the angle of inclination $a$ which is formed by the line connecting the tilting axis of the switching element 7 with the axis of the pressure roller 9 and the vertical to the contact surface of pressure roller 9 and ring 10. The angle of inclination $a$ and therewith also the point of response of the switching elements 7 can be influenced by moving the switching ring 18 axially by means of adjusting screws 20. The centre of gravity S of the switching element 7 naturally lies on the side of the tilting axis opposed to the balance weight 22.

As soon as the switching speed has been achieved, which depends both on the balance weights 22 and on the axial position of the switching ring 18, the switching elements 7 tilt in clockwise direction so that the pressure rollers 9 reach the position marked by dot and dash line. This moving is completely independent of the axial component of the circumferential force of the torque to be transmitted. As soon as the pressure roller 9 reaches the position marked by a dot and dash line, the coupling half 3 is axially displaced by the springs 21 in the direction of the switching elements 7 so that both coupling halves 3, 5 no longer intermesh with their radial tooth connection 4. The pressure roller 9 is positioned on the inclination 27 of the axially displaced position of the ring 10. This inclination 27 prevents the switching elements 7 from automatically tilting back and the coupling from switching on again. As the force of the springs 11, 21 must be overcome to be able to switch on again, the coupling can only be switched on again by outside influence.

The switching speed is not co-determined in the alternative concept of the switching ring according to FIG. 3 by axially adjusting the switching ring 18 as in FIG. 1, but by prestressing the springs 24 which are supported on the hub part 1 and act on an intermediate ring 25. The adjustment is achieved by means of a screw bolt 26 which acts on the intermediate ring and is held in the switching ring 28.

We claim:

1. A coupling with switching dependent on rotational speed, comprising: switching elements, one coupling half held in fixed connection with another coupling half up to a switching speed by being supported on said switching elements, said switching elements being centrigually controlled and spring loaded, a switching ring, said switching elements being pivoted and coupled with one another by said switching ring for joint tilting.

2. Coupling according to claim 1, including a ring elastic in axial direction, one coupling half being supported on said switching elements by said ring which is elastic in axial direction.

3. Coupling according to claim 1 including rollers with said ring, said switching elements being supported on one coupling half or on its ring with said rollers.

4. Coupling according to claim 2 including pressure springs between one coupling half and said elastic ring, prestressing of said pressure springs being greater than the axial component of the circumferential force of the torque to be transmitted by said coupling.

5. Coupling according to claim 1 wherein points of support at said switching elements have a smaller space from the coupling axis than from their tilting axis.

6. Coupling according to claim 1 wherein said switching elements are coupled to said switching ring by noses, said switching ring being axially slidable.

7. Coupling according to claim 1 wherein said switching ring is adjustable in its relative axial position to the tilting axis of said switching elements.

8. Coupling according to claim 1 including springs acting on one coupling half for separation of both coupling halves.

9. Coupling according to claim 1 including spring means for prestressing said switching ring.

10. Coupling according to claim 9, wherein one coupling half has a step for preventing said switching elements from automatically tilting back.

11. Coupling according to claim 1 including adjustable balance weights secured to said switching elements.

* * * * *